US010623272B2

United States Patent
Hamburger et al.

(10) Patent No.: US 10,623,272 B2
(45) Date of Patent: Apr. 14, 2020

(54) AUTHENTICATING CONNECTIONS AND PROGRAM IDENTITY IN A MESSAGING SYSTEM

(71) Applicant: BlackRock Financial Management, Inc., San Francisco, CA (US)

(72) Inventors: Elliot Hamburger, Taeneck, NJ (US); Jonathan S. Harris, Englewood, NJ (US); Jeffrey A. Litvin, New York, NY (US); Sauhard Sahi, New York, NY (US); John D. Valois, New York, NY (US); Ara Basil, Armonk, NY (US); Randall B. Fradin, New York, NY (US)

(73) Assignee: BlackRock Financial Management, Inc., San Francisco, CA (US)

( * ) Notice: Subject to any disclaimer, the term of this patent is extended or adjusted under 35 U.S.C. 154(b) by 234 days.

(21) Appl. No.: 15/614,611

(22) Filed: Jun. 6, 2017

(65) Prior Publication Data
US 2017/0272332 A1  Sep. 21, 2017

Related U.S. Application Data

(62) Division of application No. 15/011,334, filed on Jan. 29, 2016, now Pat. No. 9,712,398.
(Continued)

(51) Int. Cl.
*H04L 29/06* (2006.01)
*H04L 12/24* (2006.01)
(Continued)

(52) U.S. Cl.
CPC ............ *H04L 41/20* (2013.01); *G06F 15/167* (2013.01); *H04L 51/30* (2013.01); *H04L 51/36* (2013.01);
(Continued)

(58) Field of Classification Search
CPC ....... H04L 41/20; H04L 15/167; H04L 51/30; H04L 51/36; H04L 63/0442; H04L 67/1004; H04L 67/42
See application file for complete search history.

(56) References Cited

U.S. PATENT DOCUMENTS

| 5,913,024 A | 6/1999 | Green et al. |
| 6,154,543 A | 11/2000 | Baltzley |

(Continued)

FOREIGN PATENT DOCUMENTS

| WO | WO-2004/072800 A2 | 8/2004 |
| WO | WO-2008/085206 A2 | 7/2008 |
| WO | WO-2010/014386 A1 | 2/2010 |

OTHER PUBLICATIONS

Roman, M., et al., "Reflective Middleware: From Your Desk to Your Hand," Reflective Middleware, IEEE Distributed Systems Online, 2001, 19 Pages, vol. 2, No. 5.
(Continued)

*Primary Examiner* — Sarah Su
(74) *Attorney, Agent, or Firm* — Fenwick & West LLP (57) ABSTRACT

A messaging system enables client applications to send and receive messages. The messaging system includes independent component programs performing different functions of the messaging system, such as connection managers that maintain network connections with the client applications, a message router that sends received messages to recipient applications through network connections, and a dispatcher that authenticates other component programs. A messaging server may authenticate client applications using certificate-based authentication (e.g., private and public keys), authentication transfer from another trusted messaging server, or other methods (e.g., user name and password). To authenticate a component program, the dispatcher compares instantiation information (e.g., user identity, process identifier,
(Continued)

creation time) of the component program provided by the operating system with instantiation information saved in a shared memory at the time of the component program's instantiation. In response to a match, the dispatcher provides the component program with secure information through an inter-process communication socket.

20 Claims, 7 Drawing Sheets

Related U.S. Application Data (60) Provisional application No. 62/109,512, filed on Jan. 29, 2015.

(51) Int. Cl.
*H04L 12/58* (2006.01)
*G06F 15/167* (2006.01)
*H04L 29/08* (2006.01)

(52) U.S. Cl.
CPC ...... *H04L 63/0442* (2013.01); *H04L 67/1004* (2013.01); *H04L 67/42* (2013.01)

(56) References Cited

U.S. PATENT DOCUMENTS

| | | | |
|---|---|---|---|
| 6,338,089 B1 | 1/2002 | Quinlan | |
| 6,539,093 B1 | 3/2003 | Asad et al. | |
| 8,082,491 B1* | 12/2011 | Abdelaziz | G06F 9/465 |
| | | | 715/234 |
| 8,112,483 B1 | 2/2012 | Emigh et al. | |
| 8,255,455 B2 | 8/2012 | Koegel et al. | |
| 8,369,326 B2 | 2/2013 | Ansari et al. | |
| 8,392,555 B2 | 3/2013 | Gale et al. | |
| 8,453,163 B2 | 5/2013 | Kothamasu et al. | |
| 8,489,674 B2 | 7/2013 | Srivastava et al. | |
| 8,776,190 B1* | 7/2014 | Cavage | G06F 21/62 |
| | | | 726/5 |
| 2002/0055980 A1 | 5/2002 | Goddard | |
| 2002/0078345 A1* | 6/2002 | Sandhu | H04L 9/0825 |
| | | | 713/155 |
| 2003/0065711 A1 | 4/2003 | Acharya et al. | |
| 2003/0145237 A1 | 7/2003 | Chang et al. | |
| 2003/0149769 A1 | 8/2003 | Axberg et al. | |
| 2005/0086509 A1 | 4/2005 | Ranganathan | |
| 2005/0125661 A1 | 6/2005 | Vaidyanathan | |
| 2005/0138377 A1 | 6/2005 | First et al. | |
| 2006/0041660 A1 | 2/2006 | Bishop et al. | |
| 2006/0236125 A1 | 10/2006 | Sahita et al. | |
| 2008/0016221 A1 | 1/2008 | Xu et al. | |
| 2008/0127208 A1 | 5/2008 | Bedi et al. | |
| 2008/0189793 A1 | 8/2008 | Kirkup et al. | |
| 2009/0052675 A1 | 2/2009 | Levow et al. | |
| 2009/0132813 A1 | 5/2009 | Schibuk | |
| 2009/0144823 A1 | 6/2009 | Lamastra et al. | |
| 2009/0172172 A1 | 7/2009 | Graham et al. | |
| 2010/0005512 A1 | 1/2010 | Wahl | |
| 2010/0203960 A1 | 8/2010 | Wilson et al. | |
| 2010/0228973 A1 | 9/2010 | Dancer et al. | |
| 2010/0229219 A1 | 9/2010 | Mendonca | |
| 2011/0185171 A1 | 7/2011 | Karasawa et al. | |
| 2012/0011353 A1 | 1/2012 | Hayashida | |
| 2012/0072715 A1 | 3/2012 | Yonge et al. | |
| 2012/0324069 A1 | 12/2012 | Nod et al. | |
| 2013/0198763 A1 | 8/2013 | Kunze et al. | |
| 2013/0318343 A1 | 11/2013 | Bjarnason et al. | |
| 2014/0115340 A1 | 4/2014 | Lee | |
| 2014/0241373 A1 | 8/2014 | Pasam et al. | |
| 2014/0245262 A1 | 8/2014 | Hill et al. | |
| 2014/0365366 A1* | 12/2014 | Spinella | G06Q 20/027 |
| | | | 705/44 |
| 2015/0039891 A1 | 2/2015 | Ignatchenko et al. | |
| 2015/0052575 A1 | 2/2015 | Myla et al. | |
| 2015/0082025 A1 | 3/2015 | Deshpande | |
| 2015/0169875 A1 | 6/2015 | Ide et al. | |
| 2015/0334184 A1* | 11/2015 | Liverance | G06F 9/547 |
| | | | 709/203 |
| 2016/0094988 A1* | 3/2016 | Lee | H04L 9/0825 |
| | | | 380/270 |
| 2016/0134423 A1 | 5/2016 | Harjula et al. | |
| 2016/0286391 A1* | 9/2016 | Khan | G06Q 20/322 |
| 2016/0301685 A1* | 10/2016 | Mishra | H04L 63/0815 |
| 2017/0257282 A1* | 9/2017 | Hamburger | H04L 51/36 |
| 2017/0272332 A1 | 9/2017 | Hamburger et al. | |
| 2018/0278611 A1 | 9/2018 | Tan et al. | |

OTHER PUBLICATIONS

United States Office Action, U.S. Appl. No. 15/011,334, dated Jul. 7, 2016, 17 pages.
United States Office Action, U.S. Appl. No. 15/598,641, dated Dec. 14, 2018, 11 pages.
United States Office Action, U.S. Appl. No. 15/604,540, dated May 16, 2018, 16 pages.
United States Office Action, U.S. Appl. No. 15/011,250, dated Sep. 8, 2016, 9 pages.

* cited by examiner

AUTHENTICATING CONNECTIONS AND PROGRAM IDENTITY IN A MESSAGING SYSTEM

CROSS-REFERENCE TO RELATED APPLICATION

This application is a divisional application of U.S. Ser. No. 15/011,334, filed Jan. 29, 2016, which claims the benefit of U.S. Provisional Patent Application No. 62/109,512, filed Jan. 29, 2015, which is incorporated by reference herein in its entirety.

BACKGROUND

The present disclosure generally relates to a messaging-oriented middleware system and, more particularly, to establishing a chain of trust for secure connections between component programs of the messaging system and a client application.

Messaging-oriented middleware systems (also referred to herein as "messaging systems") facilitate communication between client applications distributed across diverse operating environments. For example, a messaging system enables communication between client applications executed by different servers with different operating systems. The messaging system includes different component programs on a messaging server as well as a client device. Establishing a chain of trust between these programs is difficult because many of these programs are started automatically without direct intervention by a user. When a user starts a program, the user may establish a chain of trust using a user name and password that can be verified through a system such as lightweight directory access protocol (LDAP). However, programs started automatically cannot request a password from a user. This problem occurs both when a client device establishes a connection with the messaging system and when the messaging system instantiates a component program. Overall, password-based systems are inadequate for authenticating automatically initiated programs in a messaging-oriented middleware system.

SUMMARY

A messaging system enables client applications to send and receive messages in a format independent of the client applications' respective operating environments. The messaging system includes independent component programs performing different functions of the messaging system to improve messaging system reliability and flexibility. The independent component programs of the messaging server include persistent connection managers that maintain connections with the client applications as well as an easily updateable message router that directs received messages to recipient applications through corresponding network connections. The component programs may also include an easily updateable dispatcher that establishes connections, authenticates client applications and the component programs of other messaging servers, and manages the connection managers.

According to one aspect, the messaging system ensures authentication of component programs by performing the following steps. The dispatcher stores a private key in a memory accessible by a root user identity and creates an inter-process communication (IPC) socket connection with a component program that is either a message router or a connection manager. The component program does not have permission to access the memory storing the private key. The dispatcher determines that the component program is running. In response to the component program connecting to the IPC socket connection, the dispatcher (a) obtains a first set of instantiation information describing the component program from shared memory; (b) obtains a second set of instantiation information from an operating system regarding the component program; (c) compares the first instantiation information to the second instantiation information; and (d) sends the component program the private key through the IPC socket connection if the first instantiation information matches the second instantiation information.

According to another aspect, a messaging system authenticates network connections between a remote program and a messaging server by performing the following steps. The connection manager receives, at one of its ports, a network connection transferred from the dispatcher. The message router sends (through the connection manager) a challenge string containing data unique to the network connection. The message router receives (through the connection manager) a challenge string response from the remote program. The challenge string response includes a signature on the challenge string from with a private key paired with an approved public key. The message router verifies whether the received challenge string response is valid for the network connection. In response to determining that the received challenge string response is valid, the message router processes messages sent through the network connection. In response to determining that the received challenge string response is invalid, the message router instructs the connection manager to disconnect from the client application by closing the network connection.

According to another aspect, the messaging system performs authentication transfer for a client application having an authenticated network connection with a first messaging server in a first messaging environment to enable the client application to login to a second messaging server in a different messaging environment by performing the following steps. The second messaging server receives a request from the client application to initiate a connection and sends a challenge string to the client application. The second messaging server receives a login request from the client application, which includes the client application's user identity and incorporates the second messaging server's challenge string, as encrypted by the first messaging server using the first messaging server's signature. The second messaging server decrypts the data in the login request and verifies the authentication credential included in the login request by verifying that the challenge string matches the originally sent challenge string. If the authentication credential is valid, the second messaging server verifies the user identity and messaging environment metadata included in the login request. If the authentication credential, user identity, and messaging environment metadata are valid, the second messaging server processes messages received from the client application.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Figure 1:
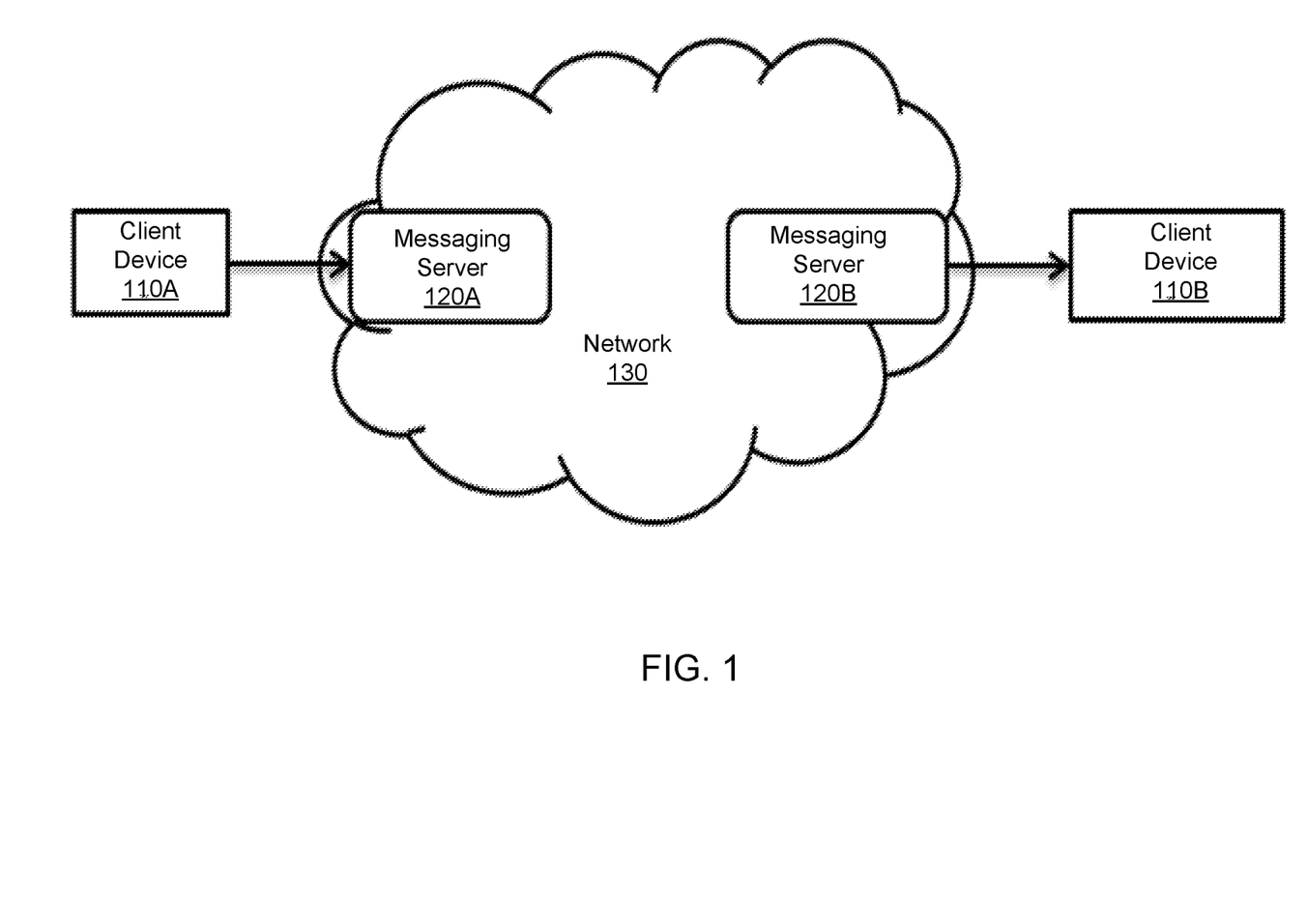
FIG. 1 is a block diagram of a system environment including a messaging system and client devices, in accordance with an embodiment.

FIG. 1 is a block diagram of a system environment including messaging system and client devices 110A and 110B (generally, client devices 110), in accordance with an embodiment. The messaging system includes messaging servers 120A and 120B (generally, messaging servers 120), which are communicatively coupled to each other and to client devices 110A and 110B through the network 130 (which may include a cloud of messaging servers 120).

The client devices 110 are computing devices including both user devices and servers. User devices include applications to enable users to view, input, manipulate, and modify information, which may be stored locally or retrieved from another device. Example user devices include desktop computers, laptop computers, servers, smartphones, tablet computers, or any other type of network-enabled device. Servers include databases that store information or programs that generate, modify, and delete information, both automatically and in response to commands from user devices and other servers. Example servers include rack-mounted servers with a Unix-based operating system. Some client devices 110 have characteristics of both user devices and servers.

The messaging system facilitates communication between client applications executed by client devices 110 by providing messaging-oriented middleware functionality. A client application communicates with at least one other client application through messages passed by the messaging system. In a typical use case referred to herein, client device 110A executes a client application that communicates with another client application executed by client device 110B through the messaging system. However, different client applications executed by the same client device 110 may communicate through the messaging system, and different instances of the same client application may communicate through the messaging system.

The messaging system includes one or more messaging servers 120 (e.g., messaging servers 120A and 120B), which are co-located with client devices 110, remotely located from client devices 110 (e.g., in a data center), or geographically dispersed (e.g., in a plurality of data centers, virtual machines, or cloud computing environments). Using a plurality of messaging servers 120 beneficially improves reliability and scalability of the messaging system. For example, the messaging system may include resiliency functions that identify when a messaging server 120 has failed and distribute the functionality of the messaging server 120 to other active messaging servers 120 or to a backup messaging server 120. Furthermore, the messaging system uses load balancing to distribute messages between similar client applications to improve responsiveness.

As used herein, a "message" refers to any communication between client applications. Example messages include a request for information from a client application, a response including the requested information, unrequested information (e.g., an update, a status report), a command for a client application, and a confirmation indicating a result of the command. The message may include encoded information representing text, numerical data, structured data (e.g., a database table), audio data, image data, video data, programmatic commands, or a combination thereof. The message may further include a header with routing information used to identify message recipients or topics that recipients are registered to receive.

The messaging system sends and receives messages through connections with client applications, which are typically persistent connections provided by a protocol with guaranteed transmission (e.g., Transmission Control Protocol (TCP), Stream TCP). Using a guaranteed-delivery protocol beneficially improves reliability of the messaging system and simplifies development of client applications that interface with the messaging system. In general, the messaging system receives a message, stores the message, identifies one or more client applications to receive the message, and sends the message to the identified client applications. Typically, the messaging system retains the message in storage only until the messaging system verifies delivery of the message to the identified client applications.

The messaging system supports one or more messaging modes, which indicate the number of message recipients and whether a response is expected. The messaging modes include broadcast mode, load balanced request/response (semaphore) mode, session (continuous semaphore) mode, fanout request mode, inter-process communication (IPC) mode, or a combination thereof.

In broadcast mode, a client application sends a message to one or more client applications without expecting a response. The broadcast message indicates a topic to which the client application is publishing the message. The messaging system delivers the broadcast message to client applications subscribed to the topic. A client application may both publish and subscribe to a topic, and multiple client applications may publish to a topic. If no client application is subscribed to the topic, then the messaging system does not deliver the broadcast message to any client application. To reply to a broadcast message, a client application may publish a broadcast message to a topic to which the publishing client application is subscribed or may use a different messaging mode.

In semaphore mode, a client application sends a single request to a specified client application and expects one or more response messages from the other client application. In continuous semaphore mode, a client application sends multiple request messages to a specified client application and expects one or more responses from the other client application. In a fanout request mode, a client application sends request messages to all client applications listening on a particular topic and expects to receive response messages from all of them. For example, a request mode message is sent to all client applications of a particular program type, belonging to a particular organization, or both. In IPC mode, two client applications exchange messages. For example, two client applications on the same client device 110 may exchange messages in IPC mode to facilitate remote method calls or execution or communication between two different operating environments.

The client devices 110 and the messaging servers 120 are connected via a network 130, which may be any suitable communications network for data transmission. The network 130 uses standard communications technologies and/or protocols and can include wide-area networks (e.g., the Internet), local-area networks (e.g., an organization's intranet), or both. In another embodiment, the network 130 includes custom and/or dedicated data communications technologies.

Typically, both client devices 110 and messaging servers 120 include hardware and software to connect to network 130 (e.g., via Ethernet, Wi-Fi, or other telecommunication technologies), store information (e.g., volatile-memory, non-volatile memory, another computer-readable medium), and process information (e.g., a processor). A client device 110 or messaging server 120 may optionally include hardware and software to present information (e.g., a display device, a projector, an audio speaker), to receive user commands and other user inputs (e.g., an input peripheral, a microphone, a camera), or both.

Although FIG. 1 illustrates two instances of the client devices 110 and the messaging servers 120, the system environment may include any number of these devices. The messaging system may include a single messaging server 120 or a plurality of messaging servers 120. Where the messaging system includes a plurality of messaging servers 120 in a data center, the messaging servers 120 may be hierarchically organized, such as in a tree structure with one messaging server 120 serving as a root node for the data center, or with any other topology. The messaging system may be distributed across a plurality of data centers. In this case, one or more messaging servers 120 may serve as global hubs that coordinate communication between messaging servers 120 in different data centers. If the messaging servers 120 are organized in a tree hierarchy within the data center, the messaging servers 120 serving as root nodes of respective data centers may also be child nodes with respect to global hub nodes.

System Architecture

Figure 2:
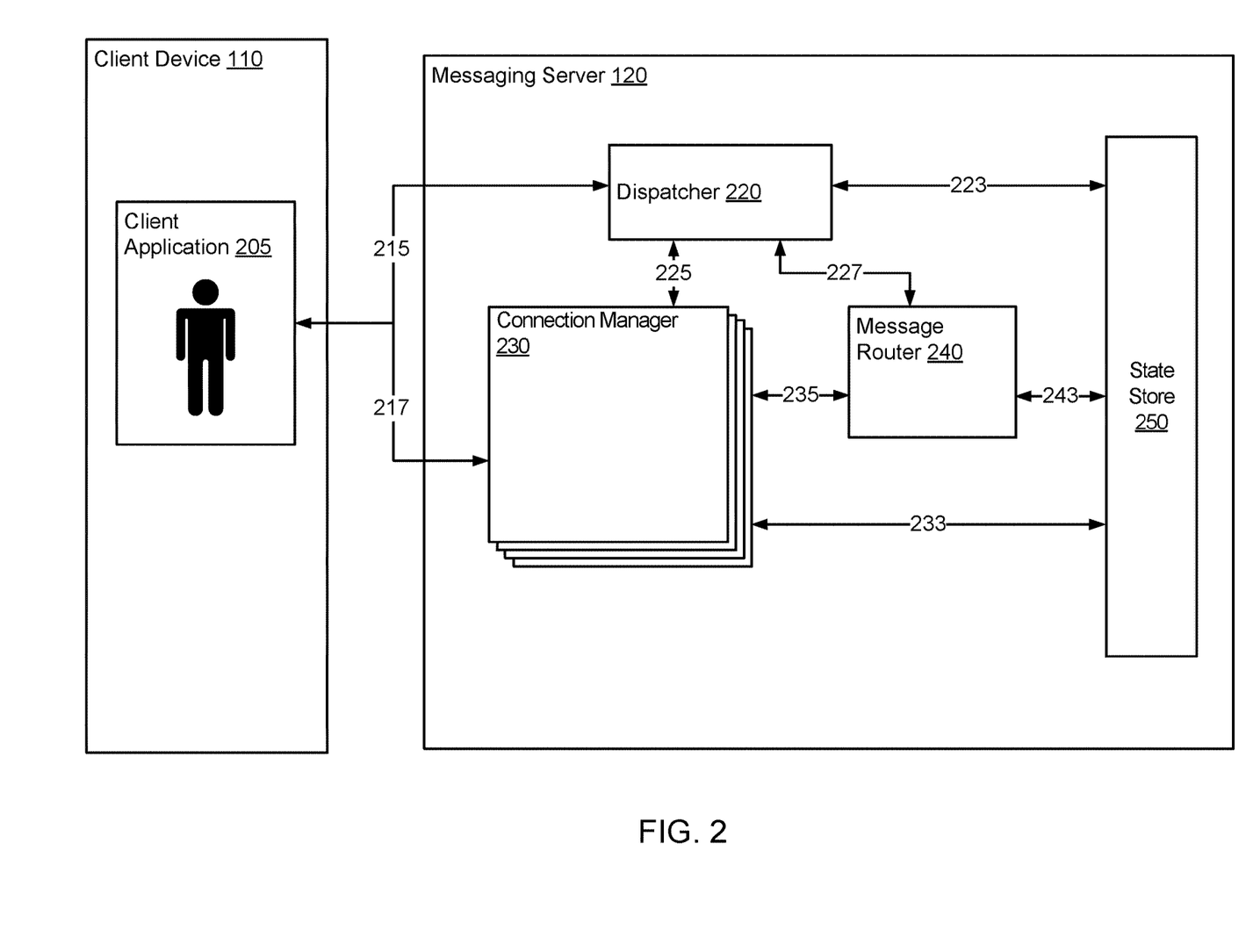
FIG. 2 is a block diagram illustrating modules within a client device and messaging server, in accordance with an embodiment.

FIG. 2 is a block diagram illustrating modules within a client device 110 and messaging server 120, in accordance with an embodiment. Some embodiments of the client device 110 and messaging server 120 have different or additional modules than the ones described here. Similarly, the functions can be distributed among the modules in a different manner than is described here, and the modules of the messaging server 120 may be executed by multiple messaging servers 120.

The client device includes one or more client applications 205. A client application 205 refers to any application that communicates through the messaging system 120. Example client applications support database management, person-to-person communication, multimedia streaming, operations management, accounting, regulatory compliance, asset trading, asset monitoring, or any other enterprise or recreational function. A client application may include an application programming interface (API) that other programs may use to request information from the client application 205 or to send commands to the client application 205. A client application 205 may include a graphical user interface (GUI) for a user to review, provide, and manipulate information.

The client application 205 generates a message for the messaging system, and sends the message to a messaging server 120. From the standpoint of the messaging system 120, the message is raw data that is not interpreted by the messaging system itself. This data could represent anything, such as raw text, structured data, a serialized Java object or a structured document in JavaScript Object Notation (JSON) or Extensible Markup Language (XML). To generate a message, the client application 205 generates a message body that incorporates the information and a message header that identifies a type of the message and any necessary routing information. For example, the client application 205 may encode the information into a byte format. As part of encoding the information, the client application 205 may encrypt the information to improve security. As expected, the client application 205 may also receive messages from the messaging server 120.

The client application 205 generates a header with parameters may include any information not part of the main body of content of the message, such as a messaging mode (e.g., broadcast mode, semaphore mode) and one or more topic identifiers corresponding to the messaging mode, or any other necessary routing information. For the broadcast mode, the topic identifier identifies which recipient client applications 205 are subscribed. For other messaging modes (e.g., semaphore mode, request mode, IPC mode), a publish subscribe model or a direct addressing model may be used such that a set of one or more receiving applications 205 use a semaphore register for a topic identifier.

The messaging server 120 is comprised of three separate programs modules including a dispatcher 220, one or more connection managers 230, a message router 240, and a state store 250.

The client application 205 is communicatively coupled to the dispatcher 220 and connection manager 230 by network connections 215 and 217, respectively. The client application 205 is not necessarily simultaneously coupled to the dispatcher 220 and connection manager 230 by network connection 215 and 217, however. For example, the client application 205 establishes network connection 215 with the dispatcher 220, which transfers the network connection 215 to the connection manager 230, thereby establishing network connection 217. The network connections 215 and 217 are generally transport-layer network connections implemented using connection oriented communications protocol having a guaranteed transmission mechanism (e.g., TCP, stream TCP). However, the transport-layer network connections 215 and 217 may be replaced or supplemented by another connection oriented network communication mechanism.

The dispatcher 220 is communicatively coupled to the connection manager 230 using IPC socket connections 225. The IPC socket connections 225 enables ordered reliable sending of datagrams, stream, and file descriptors between processes in the operating system kernel, so the IPC socket connections 225 may be used to pass network connections (e.g., 215 and 217) between program modules (e.g., 220 and 230) executed within the same operating environment. For example, the IPC socket connections 225 may be a Unix domain socket. The dispatcher 220 is similarly coupled to the message router 240 using IPC socket connection 227.

The message router 240 is connected to each connection manager 230 through a pair of messaging queues 235, one in each direction. These queues 235 are an IPC mechanism that delivers data objects in the same order they were sent. This transmission of data objects is reliable and persistent. In other words, the messaging queue has a first in, first out (FIFO) structure. A messaging queue includes internal structure that separates discrete data objects placed in the messaging queue 235, which facilitates reading of the messaging queue by a recipient component program. One example messaging queue 235 is a Portable Operating System Interface (POSIX) messaging queue. Data objects in a messaging queue 235 are generally stored in memory allocated to the kernel of an operating system executed by a messaging server 120. Alternatively or additionally, data objects in a messaging queue 235 are stored in a file system or other kernel persistent memory such as state store 250.

The dispatcher 220, the connection manager 230, and the message router 240 may access, write, modify, and delete data in the shared memory 250 through memory connections 223, 233, and 243, respectively. The shared memory 250 may be memory mapped location accessible by the program modules or a subset thereof. Accordingly, different program modules may share the same objects in memory, facilitating inter-process communication between the program modules. As an example, the memory connections 223, 233, and 243 access POSIX memory mapped files. However, a given program component cannot necessarily access all memory locations in the shared memory 250. Instead, some memory locations are accessible only to a subset of the component programs, as described in further detail below.

The dispatcher 220 establishes network connection 215 with a client application 205 in response to receiving a connection request from the client application 205.

Having established the network connection 215, the dispatcher 220 selects a connection manager 230 and transfers the network connection 215 to the selected connection manager 230. The dispatcher 220 selects a connection manager 230 according to a load balancing mechanism. A variety of load balancing mechanisms are possible. For example, the dispatcher 220 may load balance by determining a utilization rate among connection managers 230 accessible by the dispatcher 220. For example, the utilization rate may refer to a number of the connection manager's network connections. After selecting a connection manager 230, the dispatcher 220 transfers the connection 215 to it through the IPC socket connection 225. As part of transferring a network connection, the dispatcher 220 stores a connection state in state store 250. The connection state describes the network connection 215 and associates the network connection with the selected connection manager 230. Establishing a connection 217 is described in further detail with respect to FIG. 3.

The connection manager 230 maintains network connections transferred from the dispatcher 220. The connection manager 230 sends and receives messages through network connection 217. The connection manager 230 stores received messages by storing the message body, the message header, or both in state store 250. The connection manager 230 notifies message router 240 of the received message by forwarding a reference to the message to messaging queue 235. For example, the connection manager 230 generates a handle to identify the message. The handle may correspond to the storage address of the message in the state store 250. The connection manager 230 transfers the handle, the message header, or both to the message router 240 through the messaging queue 235.

Additionally, connection managers 230 process (e.g., assemble, send, delete) messages in response to message routing instructions received from the message router 240 through the messaging queue 235. For example, a message routing instruction to send a message includes a message header and a message handle. The connection manager 230 accesses the message body corresponding to the message handle from the queue 235, assembles a message including the message body and the message header, and sends the message to one or more recipient client applications based on the topic identified by the message header. For example, the connection manager 230 sends the message through network connection 217 to the client application 205 on the client device 110.

Because a message may be sent to multiple recipients, multiple connection managers 230 may share access to the message in the shared memory 250. To ensure that a message is retained until it has been sent to all intended recipients, the connection manager 230 may access and update a completion state associated with the message in the shared memory 250. The completions state indicates completion of routing instructions related to a message. For example, in response to a routing instruction to send a message, the connection manager 230 updates the completion state to reflect completion of the routing instruction. In response to a routing instruction to delete a message, a connection manager 230 compares the completion state with a completion condition included in the routing instruction to delete the message. If the completion state fulfills the completion condition, the connection manager 230 deletes the message. If the completion state does not fulfill the completion condition, the connection manager will simply leave the message as is, as it is presumed that another connection manager still needs to act on a routing instruction with the message in order to fulfill the completion condition.

The message router 240 receives a reference to a received message from a connection manager 230 and generates routing instructions for one or more connection managers 230 to deliver the message. The reference to the received message may include a message handle, a message header, or both. The message router 240 determines one or more topic identifiers of the message based on the message header. For example, for a broadcast message, the message router 240 determines recipient client applications 205 that are subscribed to a topic indicated by a topic identifier in the message header. The message router 240 then determines the network connections 217 corresponding to the recipient client applications 205, and determines the connection managers corresponding to the determined networked connections 217. The message router 240 sends those connection managers 230 routing instructions to send the message to the recipient client applications 205 using the determined connections 217. The routing instructions include a message handle as well as a message header that may include the topic identifier and in some instances the messaging mode as well. The routing instruction is delivered over the messaging queue 235 to a particular connection manager 230 in the same order they were sent by the message router 240 to ensure predictable behavior. For example, ensuring in-order delivery of instructions to a connection manager 230 ensures that the recipient client application 205 receives the messages in the same order they were sent by the sender client application 205.

The message router 240 maintains a routing state that is associated with a message in state store 250. The routing state of a message corresponds to the routing instructions issued to connection managers 230. For example, as part of issuing a routing instruction, the message router 240 updates the message's routing state to reflect that the routing instruction has been sent to the connection manager 230. When the message router 240 sends a last routing instruction pertaining to a message handle, the message router 240 determines a completion condition and attaches the completion condition to the last routing instruction. In one embodiment, the completion condition is the touch count. The last routing instruction may either be the last substantive action to be taken with respect to the message, or it may be an additional routing instruction sent after the routing instruction handling the last substantive action to explicitly request deletion of the message identified by the message handle when an included completion condition is fulfilled. Using the completion condition, the connection managers 230 tasked with fulfilling the last routing instruction can independently verify whether the message is ready for deletion.

The state store 250 maintains state information accessible to at least a subset of the component programs 220, 230, and 240 and maintained by the component programs, as described above. The state information includes message bodies, message headers, a completion state, a routing state, and a connection state. In some embodiments, the state store 250 is segmented so that different modules may access and modify only a subset of the state information.

The state store 250 may contain message payloads accessible to the connection managers 230, and message headers accessible to the message router 240. Additionally, the connection managers 230 and message router 240 pass message headers between them through messaging queue 235. The state store 250 further contains a table of connection states describing the network connections 215 and 217. The connection states are accessible by the connection managers 230, the dispatcher 220, or both. For example, the table entry for a network connection 217 may include any one or more of a socket used by the corresponding connection manager 230, an assigned UID of the socket or corresponding client application 205, and authentication information.

The state store 250 is hosted on memory allocated independently from the dispatcher 220, and message router 240, so a planned restart and/or update to any of these programs will not result in the loss of the state information.

Updates to the dispatcher 220 may result in delays to establishing new connections, but the connection manager 230 may maintain existing connections while the dispatcher 220 is updated. Similarly, updates to the message router 240 may delay routing of received messages, but the state store 250 that contains the received messages, routing state, and completion state is not affected by changes to the message router 240.

Establishing a Connection with a Client Application

Figure 3:
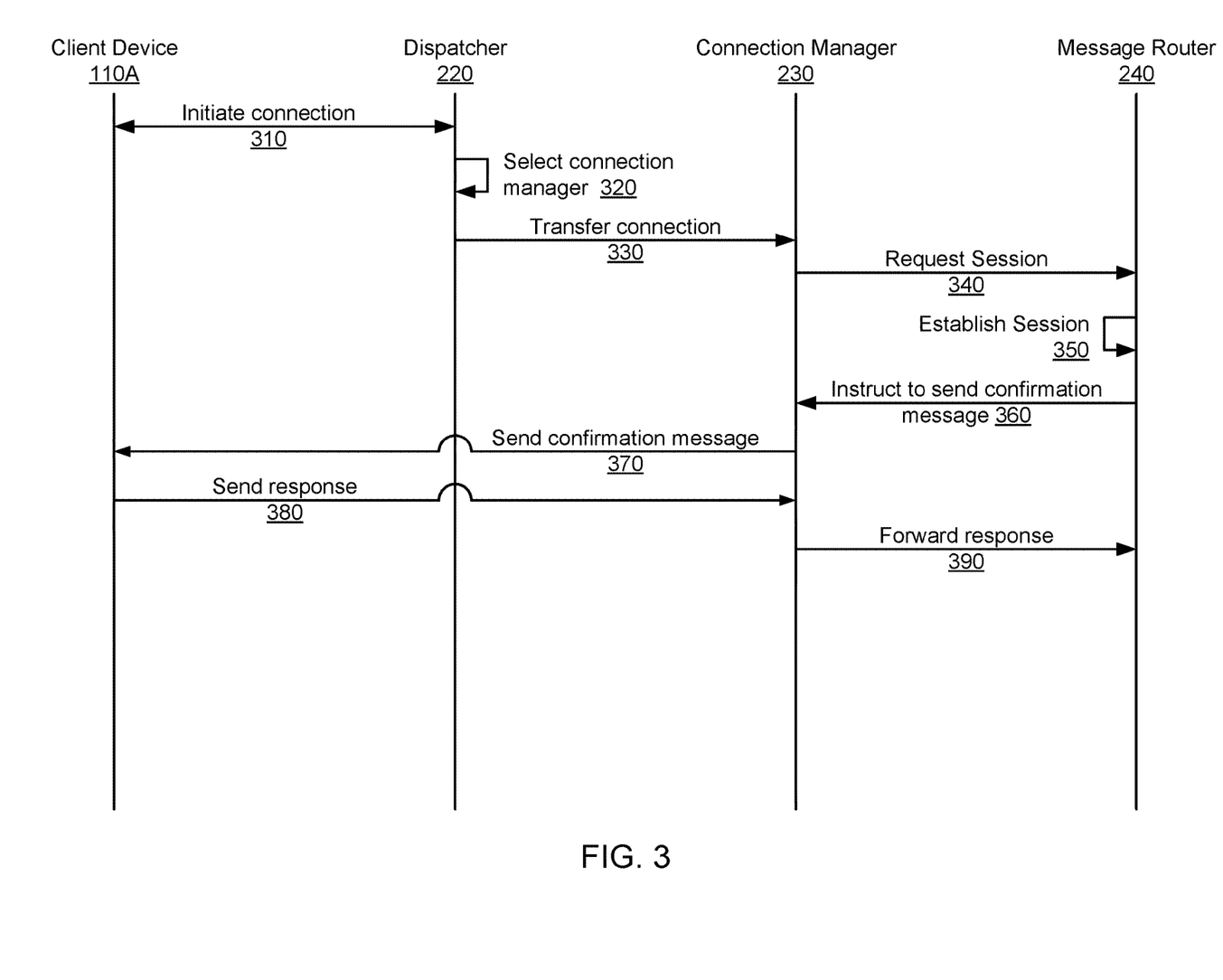
FIG. 3 is an interaction diagram illustrating a client application establishing a connection with the messaging system, in accordance with an embodiment.

FIG. 3 is an interaction diagram illustrating a client application establishing a connection with the messaging system, in accordance with an embodiment. The client device 110A (e.g., client application 205) initiates 310 network connection 215 with the dispatcher 220. The client device 110A initiates 310 the connection by contacting the dispatcher 220 at a socket and waits for establishment of the network connection 215. The dispatcher 220 accepts the network connection 215 and acknowledges the establishment of network connection 215 to the client device 110A.

The dispatcher 220 selects 320 a connection manager 230. As described previously, the dispatcher 220 selects 320 the connection manager 230 to ensure load balancing among connection managers 230. The dispatcher 220 transfers 330 the connection to the selected connection manager 230. To transfer the connection the dispatcher 220 generates a UID for the network connection 215 and identifies host information of the client application 205 and/or the client device 110A. The dispatcher 220 sends the UID for the network connection and the host information through IPC socket connection 225. The host information may include a socket assigned to the client device 110A or the client application 205, or some other signifier of where the connection is to route messages so that they arrive at the client application 205.

The connection manager 230 requests 340 a session from the message router 240. For example, the connection manager 230 may request 340 the session by sending a data object including the host information (or the UID) to message router 240 through messaging queue 235. The message router 240 establishes 350 a session based on any received information. For example, establishing a session may include the message router 240 generating a confirmation message and storing the confirmation message in the state store 250. The confirmation message may include the received information. The message router 240 instructs 360 the connection manager 230 to send the confirmation message to the client device 110A. For example, the message router 340 generates and sends a routing instruction to the connection manager 230 through messaging queue 235. In response to the routing instruction, the connection manager 230 establishes network connection 217 and sends the confirmation message to the client device 110A through the network connection 217. Network connection 217 is established at a different socket from the socket used by the dispatcher 220 to accept network connection 215.

The client device 110A (e.g., client application 205) accepts the network connection 217. The client device 110A also sends 380 a response message to the connection manager 230 through network connection 217. The response message includes information identifying the client application 205, such as a program type of the client application 205 and instance name of the client application 205. The connection manager 230 stores the response message in the state store 250 and forwards 390 the reference to the response message to the message router 240. Using the response message, the message router 240 infers that network connection 217 is active and stores the connection in association with the data object (e.g., UID, host information) used to generate the connection in the state store 250. Subsequently, the message router 240 instructs 235 the connection manager 230 to route a message to client application 205 over network connection 217.

In response to a loss of network connection 217, the client application 205 may attempt to re-establish a connection by initiating network connection 215 with the dispatcher 220. In response to a loss of network connection 217, the connection manager 230 sends a data object to the message router 240 indicating the UID of the lost network connection 217. The message router 240 removes the session state it is maintaining in state store 250, and subsequently does not issue instructions for the connection manager 230 to route any more messages through the lost network connection 217.

Sending a Message between Client Applications

Figure 4:
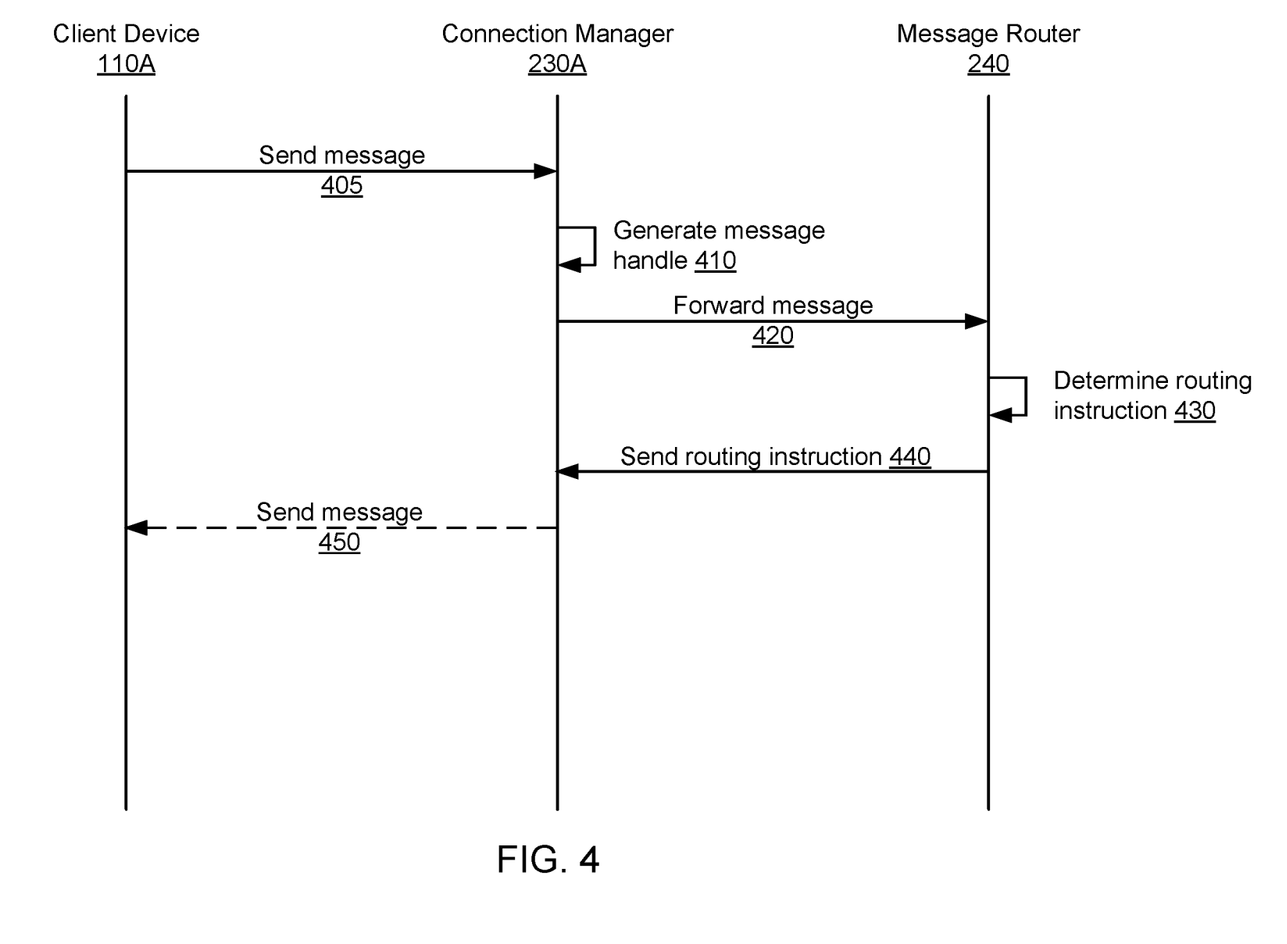
FIG. 4 is an interaction diagram illustrating a client application sending and delivering a message to the messaging system, in accordance with an embodiment.

FIG. 4 is an interaction diagram illustrating a client application 205 sending a message to the messaging system, and the messaging system delivering the message, in accordance with an embodiment. In some embodiments, the method may include different and/or additional steps than those described in conjunction with FIG. 4. Additionally, in some embodiments, the method may perform the steps in different orders than the order described in conjunction with FIG. 4, such as performing steps in parallel.

The client device 110A (e.g., client application 205) sends 405 a message through network connection 217. In response to receiving the message, connection manager 230A stores the message in state store 250 and generates 410 a message handle. For example, the message handle identifies the message's storage location in the state store 250. The connection manager 230A forwards 420 the message to the message router 240. To forward the message, the connection manager 230 forwards the message handle and message header to the message router 240.

The message router 240 determines 430 routing instructions for connection managers 230, including a routing instruction for connection manager 230B. The message router 240 determines 430 routing instructions by determining one or more recipient client applications 205 from the message header. For example, the message router 240 determines a recipient client application from the messaging mode and the one or more topic identifiers. The message router 240 identifies client applications 205 subscribed to the topic corresponding to the topic identifier included in the message header. For each identified client application 205, the message router 240 generates a routing instruction including the message handle and recipient handle. The message router 240 may generate other routing instructions, such as a routing instruction to delete a message once the message is sent to all its recipient client applications 205.

The message router 240 sends 440 routing instructions to the connection manager 230B through messaging queue 235. To send 440 a routing instruction, the message router 240 accesses a mapping between topic identifiers and established sessions in state store 250 to identify the appropriate connection manager 230 that can service client applications 205 through corresponding network connections 217 by accessing a mapping between topic identifiers and the network connections 217.

Messaging System Security

The message router 240 sends 440 routing instructions to the connection manager 230B through messaging queue 235. To send 440 a routing instruction, the message router 240 accesses a mapping between topic identifiers and established sessions in state store 250 to identify the appropriate connection manager 230 that can service client applications 205 through corresponding network connections 217 by accessing a mapping between topic identifiers and the network connections 217. The connection manager 230B sends 450 the message to the client device 110B.

A remote program may substantiate its identity through a combination of one or more authentication mechanisms, including a user name and password challenge, process inspection, certificate-based authentication, or authentication transfer. A user name and password challenge refers to providing a user name entered through a GUI as well as a hash of a password entered through the GUI. This authentication is applicable to client applications 205 directly invoked by a user through a GUI but is inapplicable to automatically started client applications 205 as well as component programs of the messaging server 120.

Certificate-based authentication refers to authentication of remote programs by exchanging information encrypted using a key. Certificate-based authentication includes asymmetric encryption schemes, where a remote program substantiates its identity by proving that it has access to a private key. For example, a remote program may substantiate its identity by responding to a challenge string sent by the message router 240 with a digital signature that includes a hash encrypted with the private key of the remote program. Certificate-based authentication may alternatively or additionally include symmetric encryption schemes, where the remote program and the dispatcher both have access to a shared secret or key, such as a secret generated through a Diffie-Hellman key exchange. An example of certificate-based authentication is described in further detail with respect to FIG. 5, described in the section titled "Authenticating Network Connections" below.

Authenticating Network Connections

Figure 5:
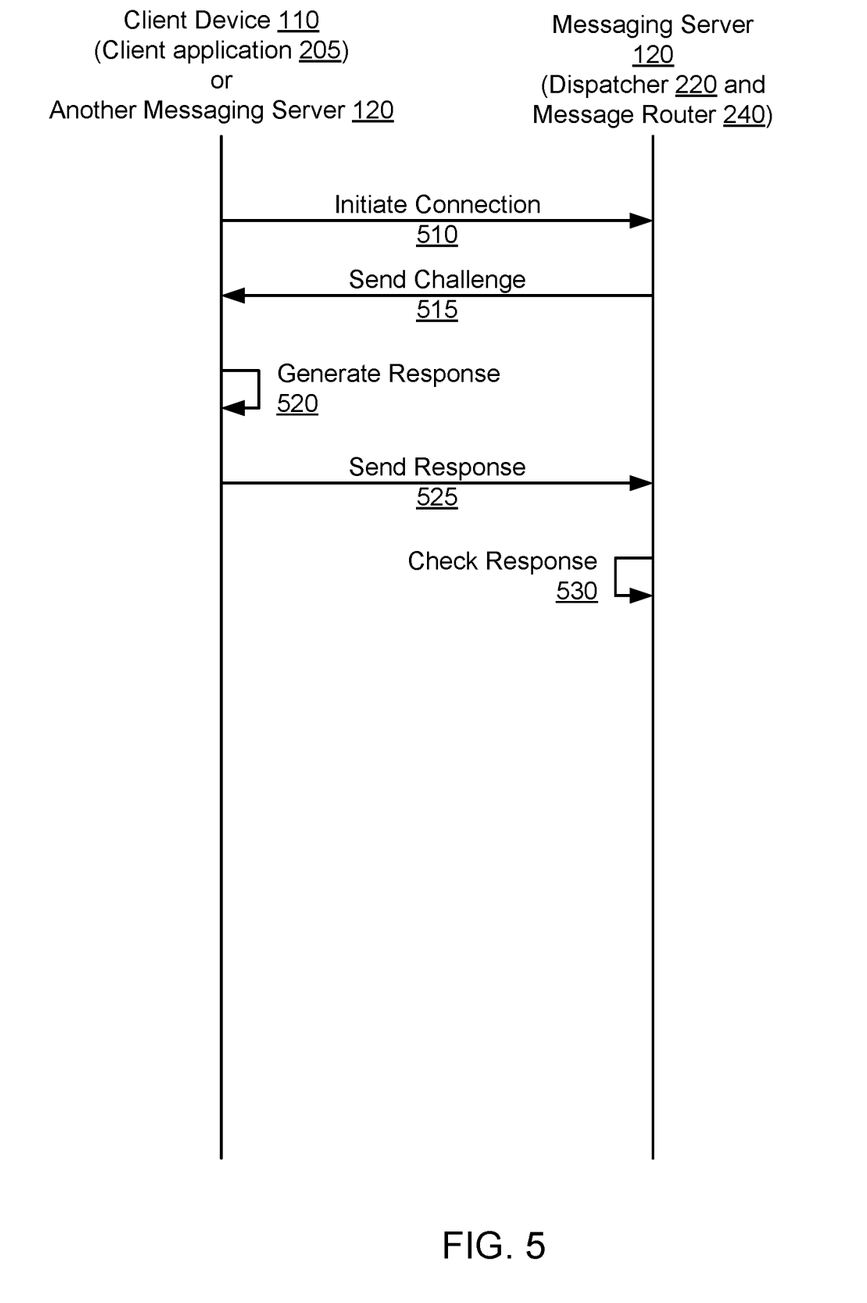
FIG. 5 is an interaction diagram illustrating an example process of authenticating a network connection, in accordance with an embodiment.

FIG. 5 is an interaction diagram illustrating an example process of authenticating a network connection, in accordance with an embodiment. In the illustrated example, the messaging server 120 authenticates a remote program executed by client device 110 that has established network connection 217 with a connection manager 230.

The remote program is generally a client application 205 with a network connection 217 having been transferred from the dispatcher 220 after initiating network connection 215. However, the messaging server 120 may also use the process of FIG. 5 to authenticate a component program of another messaging server 120 (thus replacing the client device 110 in FIG. 5 and the following description with another messaging server (not shown)). The client device 110 or another messaging server 120 initiates 510 a network connection with the messaging server 120, specifically, either the dispatcher 220 or the message router 240. The message router 240 sends 515 a challenge string to the client device 110 through network connection 217. To send 515 the challenge string, the message router 240 generates a challenge string containing data unique to the incoming connection, and stores the unique challenge string in association with the network connection 217. To generate the challenge string, the message router 240 may use an approved public key (e.g., a root public key) associated with the remote program and accessible to the message router 240. The approved public key is paired with a root private key accessible to the remote program.

The remote program generates 520 a response to the challenge string. To generate 520 the response, the remote program accesses a private key generated from the root private key paired with the approved public key. The remote program generates a signature on the challenge string using the private key. Generating the signature on the challenge string may include operations such as decoding the challenge string using the private key. The remote program sends 525 the dispatcher 220 a response to the challenge string. The response includes the signature on the challenge string and a copy of the public key corresponding to the private key. For example, the response may be encoded in a format such as PKCS #7 (Public Key Cryptography Standard #7).

The message router 240 receives the response to the challenge string and checks 530 the response. Checking the response includes determining whether the signature on the response corresponds to the public key included in the response. Checking 530 the response may also include retrieving the challenge issued to authenticate the network connection and determining whether the received response matches the expected response to the retrieved challenge. Checking the response against the challenge string prevents a replay attack where a malicious user sends a response generated by the remote program in response to a previous challenge string.

Checking 530 the response further includes determining whether the public key included in the response is valid by determining whether there is a chain of trust between the public key and the approved public key. For example, a chain of trust exists when the public key in the response is an approved public key or has been signed by an approved public key. Verifying the chain of trust between the public key and an approved public key may be a recursive process. The message router 240 identifies the parent public key used to sign the public key included in the response and determines whether there is a chain of trust between the parent public key and an approved public key. Once a parent public key is identified that is an approved public key, the chain of trust is validated. If the recursive process identifies a parent public key that is not an approved public key and that has not been signed by any other public key, then the chain of trust is invalid.

In response to determining that the response matches the challenge string, the message router 240 determines that the identity of the remote program is authenticated, and the message router 240 allows the client application 205 to begin sending and receiving messages through network connection 217. In response to determining that the response does not match the challenge string, the message router 240 determines that the remote program does not have a valid identity, and the message router 240 terminates the corresponding network connection 217 through an instruction to the connection manager 230.

Authentication Transfer

A messaging environment refers to a plurality of messaging server nodes connected to each other. The messaging server nodes in a given messaging environment can only communicate with other messaging server nodes in the same messaging environment. However, some client applications 205 may connect to and interact with multiple segregated messaging environments (e.g., messaging environments in different organizations).

To this end, authentication transfer refers at a high level to a client application 205 leveraging an authentication previously done with a messaging server 120A in messaging environment A as a credential to authenticate to a new messaging server 120B in a new messaging environment B. When connecting to the new messaging server 120B, the client application 205 receives a challenge string from the new messaging server 120B as part of receiving a unique challenge string for certificate-based authentication (e.g., step 515 in FIG. 5). Upon receipt of this challenge string, the client application 205 generates an authentication transfer ticket request and sends it to the messaging server 120A. The authentication transfer ticket request contains this new challenge string. The message router 240 on the messaging server 120A signs the authentication transfer ticket with its own private key and returns an authentication transfer ticket response to the client application 205. The client application 205 in turn submits a login request based on the authentication transfer ticket response to the new messaging server 120B, which decrypts the signature, verifies the validity of the user name and original network, and acknowledges to the client application 205 that this constitutes a successful authentication. Thus, authentication transfer obviates a user entering a user name and password when switching between messaging servers in different messaging environments.

Figure 6:
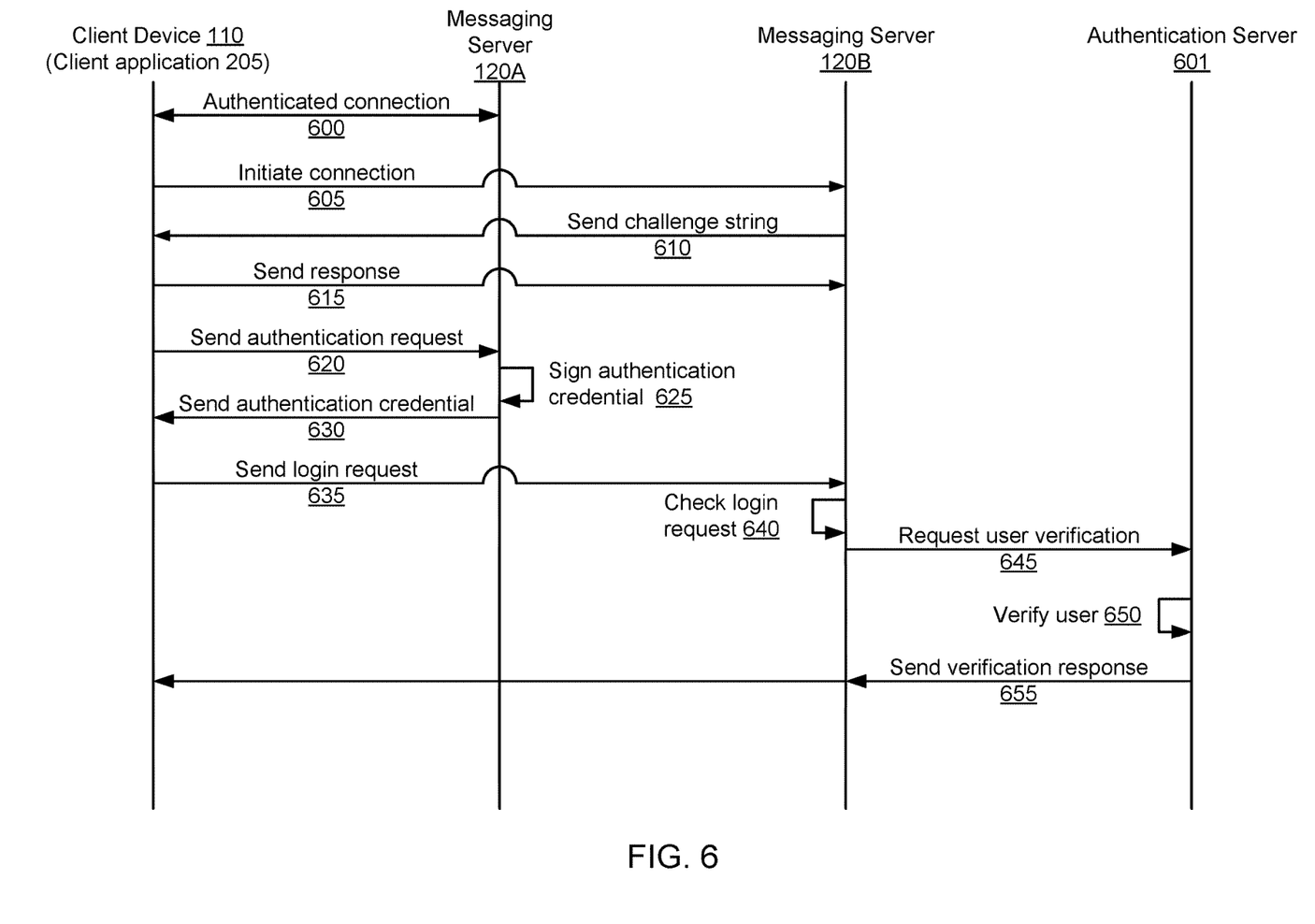
FIG. 6 is an interaction diagram illustrating an example process of transferring authentication for a client device between messaging servers, in accordance with an embodiment.

FIG. 6 is an interaction diagram illustrating in detail an example process of transferring authentication for a client device between messaging servers, in accordance with an embodiment. A client application 205 of client device 110 is maintaining 600 an initial network connection 217 with messaging server 120A. The initial network connection 217 has been authenticated, such as through certificate-based authentication. The client device 110A initiates 605 a network connection 215 with messaging server 120B, which is remote relative to messaging server 120A. For example, messaging server 120A is affiliated with organization A, messaging server 120B is affiliated with to a different organization B, and the client application 205 that was already connected and authenticated to messaging server 120A is attempting to communicate with organization B via messaging server 120B. This mechanism allows client application 205 to authenticate to messaging server 120B without prompting the user for credentials for messaging server 120B's organization (organization B in this example). This mechanism is not limited to cross-organization communication. A client application 205 may also use the authentication transfer mechanism to connect to another messaging server 120 in the same organization as messaging server 120A without providing user name and password credentials.

The messaging server 120B sends 610 a greeting message including a challenge string. For example, the greeting message includes a 24-byte challenge string and a messaging system version number, and the greeting message is delivered through a secure socket connection. The client device 110 receives the greeting message and sends 615 the messaging server 120B a response to the greeting message. The messaging server 120B begins waiting for a login request after receiving the response to the greeting message.

The client device 110 generates and sends 620 an authentication transfer ticket request ("authentication request") to the messaging server 120A, which has already authenticated the identity of the client application 205. The authentication request is message with a header indicating that the message is an authentication request. The header includes a source identifier corresponding to the authentication request. The body of the authentication request includes the challenge string sent by the messaging server 120B. The messaging server 120A generates an authentication transfer ticket response ("authentication response") including a signed authentication credential. The messaging server 120A signs 625 the authentication credential using a private key. The authentication response is a message having a header indicating that the message is an authentication response. The header includes the source identifier from the authentication request, and the body of the authentication response includes the signed authentication credential (e.g., the challenge string encrypted using a signature of the messaging server 120A). The messaging server 120A sends 630 the authentication response to the client device 110.

The client device 110 generates and sends 635 a login request to the messaging server 120B. The login request is a message containing a user name of the client application 205, messaging environment metadata, and the signed authentication credential from the authentication response. Messaging environment metadata describes the organization corresponding to a messaging environment (e.g., a messaging system code for the organization, an abbreviation of the organization) as well as other characteristics of the messaging environment. The messaging server 120B checks 640 the login request by: (1) decrypting the challenge string and confirming the challenge string matches the challenge string sent in the greeting message; (2) confirming that the authenticated challenge string has a format consistent with an authentication transfer ticket response; (3) checking the signature on the authenticated challenge string is valid; (4) verifying that the signer is a messaging server, such as 120A, that is authorized to issue authentication transfer responses; and (5) checking that the client application 205 (and/or client device 110) is authorized to generate authentication transfer requests for the destination client application 205 associated with the messaging server 120B. If the messaging server 120B determines that the login request is invalid (because any of steps (1) through (5) are invalid), the messaging server 120B closes the network connection 215 with the client device 110.

If the login request passes the checks, the messaging server 120B requests verification of the user name and messaging environment metadata included in the login request by generating and sending 645 a user verification request to an authentication server 601. The authentication server 601 maintains a registry of valid user names and associated messaging environment metadata to provide a further check on information contained in the login request. For example, the authentication server queries LDAP on behalf of messaging server 120B to verify the information in the login request. LDAP contains metadata about user accounts, such as user names, passwords, and associated messaging environment metadata (e.g., organization abbreviations). The user verification request indicates that it is a user verification request and includes the user name and abbreviation of the client application's organization from the login request. The user verification request may further include a header indicating that the user verification request is a semaphore type message. The header also includes the source identifier of the client application 205. The authentication server 601 verifies 650 the information contained in the user verification request to ensure that (1) the user name is valid and (2) the messaging environment metadata matches the user name.

In response to successfully verifying 650 the information included in the user verification request, the authentication server 601 generates and sends 655 a user verification response to the messaging server 120B and the client device 110. The user verification response is a message including a header indicating the message is a user verification response. The header of the user verification response includes the source identifier and a code corresponding to the organization of the client application 205.

In response to receiving the user verification response indicating verification of the user name, the messaging server 120B accepts the network connection 215 with the client device 110. If the user verification response indicates that the user name is invalid, or if the other information in the user verification request does not match the user name, the messaging server 120B closes the network connection 215.

Authenticating Component Program Identity

Figure 7:
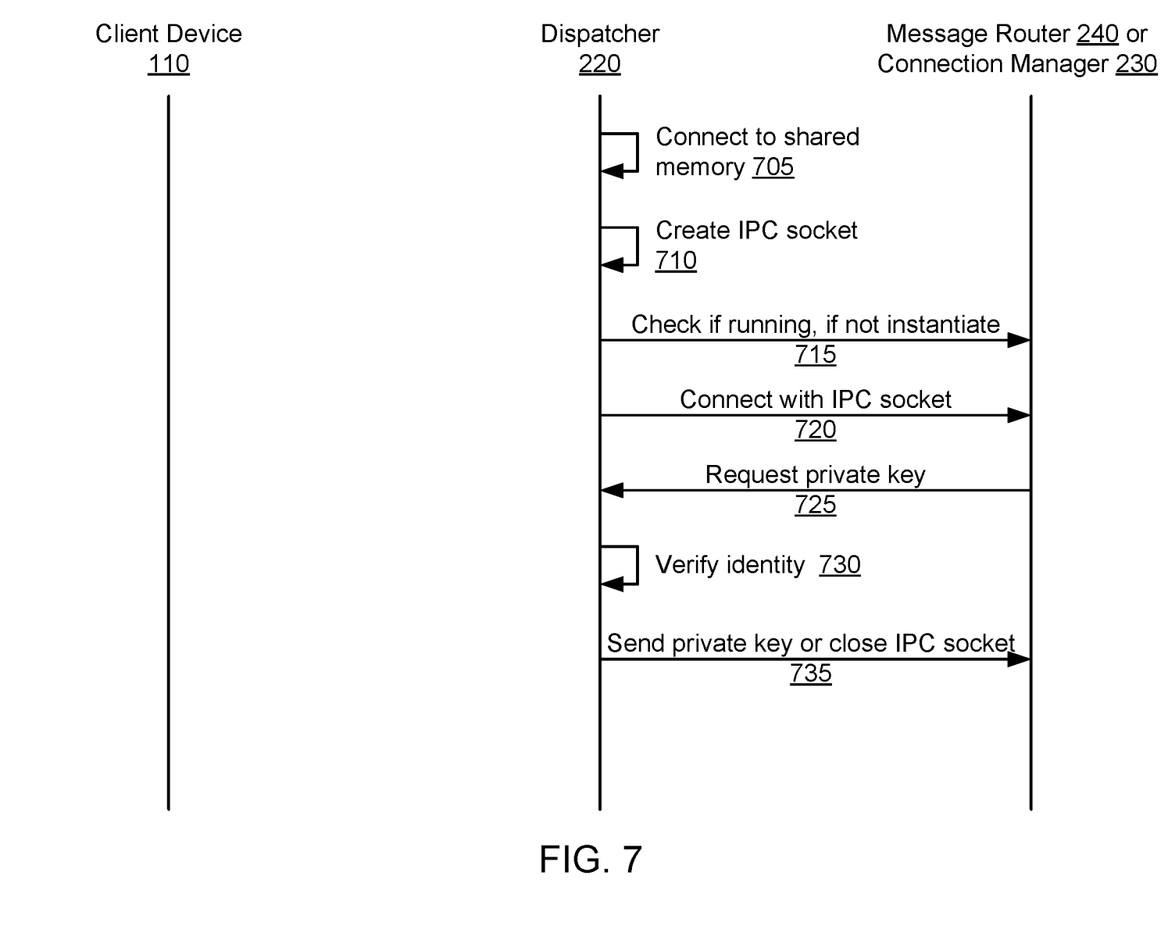
FIG. 7 is an interaction diagram illustrating an example process of authenticating identity of a component program, in accordance with an embodiment.

FIG. 7 is an interaction diagram illustrating an example process of authenticating identity of a component program, in accordance with an embodiment. In the illustrated example, the messaging server 120 establishes a chain of trust between the dispatcher 220 and another program component (e.g., a message router 240, a connection manager 230). By establishing the chain of trust between the program components, the messaging server 120 may send secure information between the program components through an IPC socket connection (e.g., 225 or 227).

The dispatcher 220 connects 705 to shared memory contained in state store 250. The dispatcher 220 may connect 705 to the shared memory in response to the messaging server 120 powering on or restarting, for example. The messaging server 120 initializes the dispatcher 220 as a root user. A root user refers to an identity having permissions not available to other component programs of the messaging server 120. As a root user, the dispatcher 220 may instantiate another component program, instantiate an IPC connection between component programs, temporarily change its own identity to another user having fewer authorizations, and read and write to shared memory accessible only by a root user. The dispatcher 220 determines whether the state store 250 contains shared memory for the dispatcher 220. If the state store 250 contains a dispatcher shared memory, the dispatcher 220 reconnects to the dispatcher shared memory. If the state store 250 does not contain the dispatcher shared memory, the dispatcher 220 allocates the dispatcher shared memory and connects to it. As part of allocating the dispatcher shared memory, the dispatcher 220 sets the dispatcher shared memory to allow read and write access only to component programs having a root user identity.

The dispatcher 220 begins listening on an IPC server socket connection 225 or 227 used by the connection manager 230 and the message router 240 to connect to the dispatcher 220.

The dispatcher 220 determines whether the messaging server 120 is executing a message router 240 and a connection manager 230. If the messaging server 120 is executing the message router 240 and the connection manager 230, the process continues to step 720. If one or both of these components is not running on the messaging server 120, the dispatcher 220 instantiates 715 whichever of them is not running. To do this, the dispatcher 220 changes its identity to a reduced or minimal permissions user identity, such as one used to create 710 the IPC socket connections 225 and 227. Using the user identity, the dispatcher 220 instantiates 715 the message router 240 and/or the connections manager 230. The dispatcher 220 stores a process identifier and the start time of the message router 240 and/or the connection manager 230, as well as the corresponding user identity, in the dispatcher shared memory (reverting to the root user identity first if necessary). These stored items of information may be referred to as "instantiation information" for convenience, and may be used to verify the identity of the process when it requests private keys and other secure information. The dispatcher 220 then reverts its identify to the root user identity.

The message router 240 and connection manager 230 open connections 225 and 227, respectively with to the IPC server socket that the dispatcher 220 opened previously.

As a final set of steps in establishing a secure connection to the dispatcher 220, the message router 240 or the connection manager 230 requests 725 the private key over 225 and 227, respectively. In response to the request, the dispatcher 220 verifies 730 the identity of the message router 240 or connection manager 230. To do this, the dispatcher 220, as the root user identity, queries the operating system of the messaging server 120 for the user identity, the process identifier, and/or start time of the message router 240 or connection manager 230 making the request. The dispatcher 220, as the root user identity, also queries the dispatcher shared memory for the process identifier, start time, and/or corresponding user identifier associated with the request. The dispatcher 220 compares the process identifier, start time, and/or corresponding user identity accessed from the dispatcher shared memory with those of the requesting message router 240 or connection manager 230. If all of the process identifier, start time, and/or corresponding user identity match between the dispatcher shared memory and requesting component, the dispatcher 220 sends 735 the private key (or other requested secure information) to the requesting message router 240 or connection manager 230 through the corresponding IPC socket 225 or 227.

If any of the process identifier, start time, and/or corresponding user identifier do not match, the dispatcher 220 closes the IPC socket 225 or 227 and/or the network connection 217 corresponding to the request.

The dispatcher 220 obtains the private key from a client device 110 that has initiated an authenticated connection, as described in conjunction with FIG. 3. To obtain the private key, the dispatcher 220 accesses an encrypted version of the private key using a public file system mount. For example, the file system mount is an NFS (Network File System) mount. The dispatcher 220 decrypts the encrypted private key and stores the encrypted private key in process memory of the dispatcher. Alternatively, the dispatcher 220 stores the encrypted private key in dispatcher shared memory or other memory accessible to the dispatcher 220 and not accessible to the message router 240 and connection managers 230. To decrypt the private key, the dispatcher 220 may, for example, use symmetric key decryption (e.g., Advanced Encryption Standard (AES)), assuming the key was encrypted accordingly. To do this, the dispatcher 220 may change its identity to a key access user identity having access to the symmetric key, load the symmetric key from a private file system mount accessible only to the key access user identity, and decrypt the private key using the loaded symmetric key. The dispatcher 220 then reverts its identify to the root user identity. The dispatcher 220 may access the encrypted private key during a TLS (transport layer security) session or prior to establishing a TLS session. To establish a TLS session, the message router 240 instructs the connection manager 230 to establish the TLS session after confirming the network connection 217 (e.g., step 370 in FIG. 3). After establishing the TLS session, the connection manager 230 may use the decrypted private key to upgrade the network connection 217 to an encrypted TLS connection.

The dispatcher 220 also secures the IPC messages queues 235 between connection managers 230 and the message router 240. This allows connection managers 230 and the message router 240 to trust each other. The dispatcher 220 determines whether the message queues 235 exist on the messaging server 120. If the corresponding message queues 235 exist, the dispatcher continues to step 715. If the corresponding message queues 235 do not exist, the dispatcher 220 creates message queues 235 (e.g., immediately before, immediately after, or concurrently with step 710). To do this, the dispatcher 220 changes its identity to a reduced or minimal permissions user identity, which is a preconfigured account used permanently by the message router 240 and the connection managers 230, and temporarily by the dispatcher 220. Using the minimal permissions user identity, the dispatcher 220 then creates the message queues 235 and sets permission for the message queues 235 so that only a user with those same user identity permissions user may connect. The dispatcher 220 then reverts its identify to the root user identity.

Additional Configuration Information

In the client device 110 and messaging system 120, the program code and modules implementing the functionality described herein are not native components of underlying machine or system, and thus extend the operations and functionality thereof beyond their generic functions and capabilities. The client device 110 includes a client application 205, and the messaging system 120 includes a dispatcher 220, a connection manager 230, a message router 240, a state store 250. Those of skill in the art will appreciate that these databases, information, data structures, program code, and modules are not components of a generic computer, and that the client device 110 messaging system 120 may contain other databases, program code, or modules that are not explicitly mentioned here. Additionally, the operations listed here are necessarily performed at such a frequency and over such a large set of data that they must be performed by a computer in order to be performed in a commercially useful amount of time, and thus cannot be performed in any useful embodiment by mental steps in the human mind.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B is true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for authenticating network connections and component program identities in a messaging system. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

What is claimed is:

1. A method of performing authentication transfer for a client application having an authenticated network connection with a first messaging server in a first messaging environment, the method comprising:

receiving, at a second messaging server in a different messaging environment from the first messaging environment, a request from the client application to initiate a connection;

sending a challenge string from the second messaging server to the client application;

receiving, at the second messaging server, a login request from the client application, the login request comprising a user identity of the client application and messaging environment metadata, the login request incorporating the challenge string encrypted using a signature made by the first messaging server on the challenge string;

verifying, by the second messaging server, an authentication credential included in the login request by verifying that the authentication credential incorporates a challenge string matching the sent challenge string;

responsive to verifying the authentication credential, verifying the user identity and the messaging environment metadata included in the login request; and responsive to verifying the user identity and the messaging environment metadata, processing messages received at the second messaging server from the client application.

2. The method of claim 1, wherein verifying the authentication comprises:

decrypting the authentication credential;

confirming the challenge string from the decrypted authentication credential corresponds to the challenge string sent to the client application;

verifying that the first messaging server is authorized to issue authentication credentials for authentication transfer; and verifying that the client application is authorized to request authentication from the second messaging server using authentication transfer.

3. The method of claim 2, wherein the challenge string is signed by the first messaging server using a private key of the first messaging server, and wherein decrypting the authentication credential comprises:

applying, by the second messaging server, a public key of the first messaging server to the authentication credential.

4. The method of claim 1, further comprising the second messaging server disconnecting from the client application responsive to determining that either the authentication credential is invalid or that the user identity is invalid.

5. The method of claim 1, wherein the first messaging environment is associated with a first organization and the second messaging environment is associated with a second organization.

6. The method of claim 5, wherein the messaging environment metadata comprises information describing the first organization, and wherein verifying the user identity and the messaging environment metadata included in the login request comprises:

sending a user verification request to an authentication server, the user verification request comprising the user identity and at least some of the messaging environment metadata; and receiving, from the authentication server, a user verification response indicating whether the user identity is associated with the first organization.

7. The method of claim 6, further comprising verifying the user identity and the messaging environment metadata responsive to the received user verification response indicating that the user identity is associated with the first organization.

8. A non-transitory computer-readable storage medium storing computer program instructions executable by a processor to perform operations for authentication transfer for a client application having an authenticated network connection with a first messaging server in a first messaging environment, the operations comprising:

receiving, at a second messaging server in a different messaging environment from the first messaging environment, a request from the client application to initiate a connection;

sending a challenge string from the second messaging server to the client application;

receiving, at the second messaging server, a login request from the client application, the login request comprising a user identity of the client application and messaging environment metadata, the login request incorporating the challenge string encrypted using a signature made by the first messaging server on the challenge string;

verifying, by the second messaging server, an authentication credential included in the login request by verifying that the authentication credential incorporates a challenge string matching the sent challenge string;

responsive to verifying the authentication credential, verifying the user identity and the messaging environment metadata included in the login request; and responsive to verifying the user identity and the messaging environment metadata, processing messages received at the second messaging server from the client application.

9. The non-transitory computer-readable medium of claim 8, wherein verifying the authentication comprises:

decrypting the authentication credential;

confirming the challenge string from the decrypted authentication credential corresponds to the challenge string sent to the client application;

verifying that the first messaging server is authorized to issue authentication credentials for authentication transfer; and verifying that the client application is authorized to request authentication from the second messaging server using authentication transfer.

10. The non-transitory computer-readable medium of claim 9, wherein the challenge string is signed by the first messaging server using a private key of the first messaging server, and wherein decrypting the authentication credential comprises:

applying, by the second messaging server, a public key of the first messaging server to the authentication credential.

11. The non-transitory computer-readable medium of claim 8, the operations further comprising the second messaging server disconnecting from the client application responsive to determining that either the authentication credential is invalid or that the user identity is invalid.

12. The non-transitory computer-readable medium of claim 8, wherein the first messaging environment is associated with a first organization and the second messaging environment is associated with a second organization.

13. The non-transitory computer-readable medium of claim 12, wherein the messaging environment metadata comprises information describing the first organization, and wherein verifying the user identity and the messaging environment metadata included in the login request comprises:

sending a user verification request to an authentication server, the user verification request comprising the user identity and at least some of the messaging environment metadata; and receiving, from the authentication server, a user verification response indicating whether the user identity is associated with the first organization.

14. The non-transitory computer-readable medium of claim 13, further comprising verifying the user identity and the messaging environment metadata responsive to the received user verification response indicating that the user identity is associated with the first organization.

15. A system comprising:
a processor for executing computer program instructions; and
a non-transitory computer-readable storage medium storing computer program instructions executable by the processor to perform operations for authentication transfer for a client application having an authenticated network connection with a first messaging server in a first messaging environment, the operations comprising:
receiving, at a second messaging server in a different messaging environment from the first messaging environment, a request from the client application to initiate a connection;
sending a challenge string from the second messaging server to the client application;
receiving, at the second messaging server, a login request from the client application, the login request comprising a user identity of the client application and messaging environment metadata, the login request incorporating the challenge string encrypted using a signature made by the first messaging server on the challenge string;
verifying, by the second messaging server, an authentication credential included in the login request by verifying that the authentication credential incorporates a challenge string matching the sent challenge string;
responsive to verifying the authentication credential, verifying the user identity and the messaging environment metadata included in the login request; and
responsive to verifying the user identity and the messaging environment metadata, processing messages received at the second messaging server from the client application.

16. The system of claim 15, wherein verifying the authentication comprises:
decrypting the authentication credential;
confirming the challenge string from the decrypted authentication credential corresponds to the challenge string sent to the client application;
verifying that the first messaging server is authorized to issue authentication credentials for authentication transfer; and
verifying that the client application is authorized to request authentication from the second messaging server using authentication transfer.

17. The system of claim 16, wherein the challenge string is signed by the first messaging server using a private key of the first messaging server, and wherein decrypting the authentication credential comprises:
applying, by the second messaging server, a public key of the first messaging server to the authentication credential.

18. The system of claim 15, the operations further comprising the second messaging server disconnecting from the client application responsive to determining that either the authentication credential is invalid or that the user identity is invalid.

19. The system of claim 15, wherein the first messaging environment is associated with a first organization and the second messaging environment is associated with a second organization.

20. The system of claim 19, wherein the messaging environment metadata comprises information describing the first organization, and wherein verifying the user identity and the messaging environment metadata included in the login request comprises:
sending a user verification request to an authentication server, the user verification request comprising the user identity and at least some of the messaging environment metadata; and
receiving, from the authentication server, a user verification response indicating whether the user identity is associated with the first organization.

* * * * *